United States Patent Office 2,934,848
Patented May 3, 1960

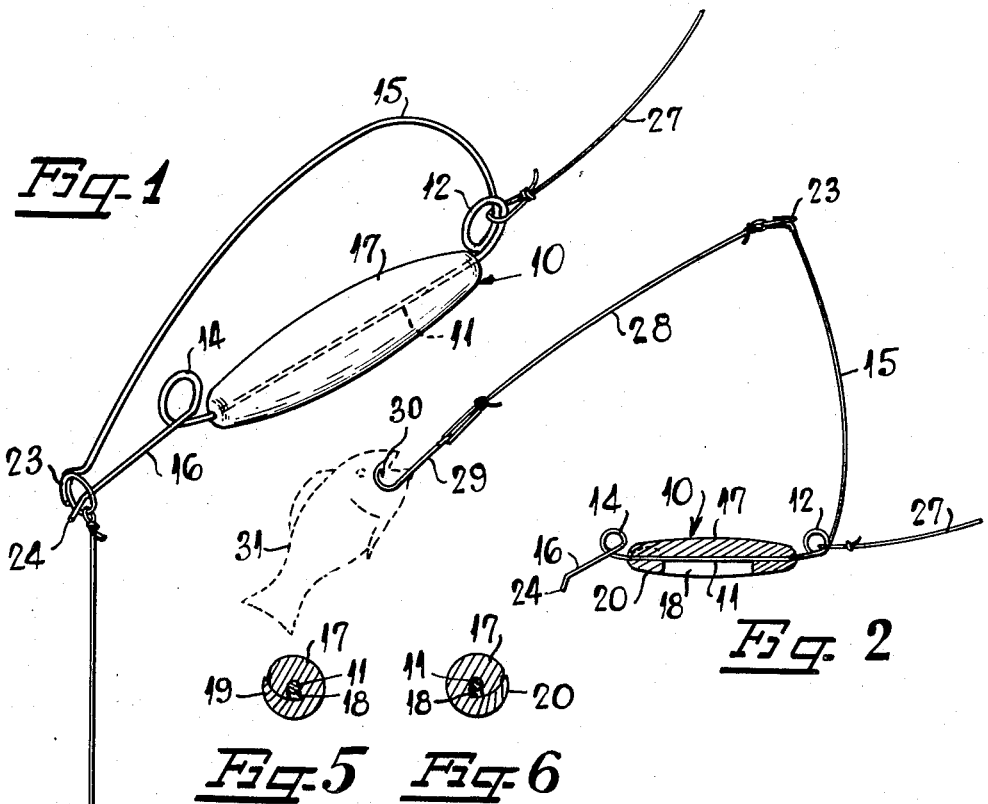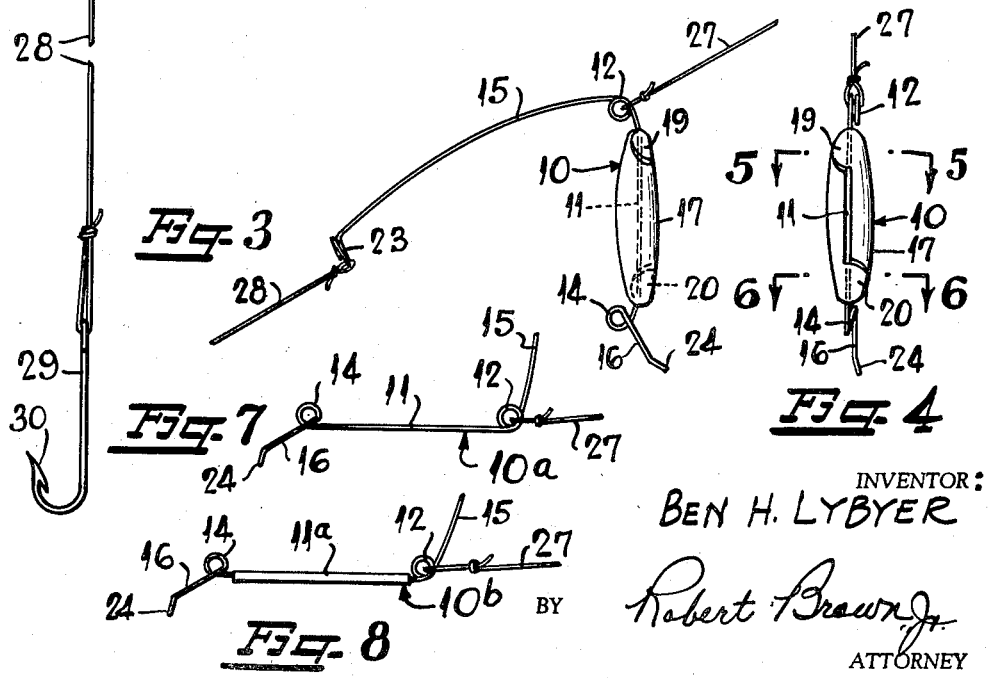

2,934,848
FISHHOOK SETTER
Ben H. Lybyer, Casper, Wyo.
Application April 14, 1959, Serial No. 806,281
3 Claims. (Cl. 43—15)

This invention relates to fishing equipment and more particularly to a hook setter forming a portion of a fishing line.

It is an object of this invention to provide a hook setter which operates automatically in response to a nibble by the fish to jerk the hook and force its barbed end into the mouth of the fish.

It is another object of this invention to provide a hook setter of the class described in which an improved snap action is employed for imparting a jerk or sudden movement to the hook. The hook setter is formed from an elongated spring wire having spaced oppositely-acting spring coils therein, and also having long and short wire end portions respectively projecting from the coils. A hook line is secured to the free end of the long end portion, and when the device is cocked, the extremities of the long and short end portions are releasably latched together against the tension of said coils. The improved snap action can be attributed, in part, to the oppositely-acting spring coils which, when released, cause the short and long end portions to rotate in opposite directions and thereby reduce the tendency of the hook setter to rotate bodily as a unit. This stabilizing action, in turn, causes the major portion of the stress in the long end portion to be utilized in imparting a sudden movement or jerk to the hook when the latch is released.

It is a further object of this invention to provide a hook setter having an improved latch structure for releasably confining the force necessary to operate the hook setter when a fish nibbles at the hook. One unique feature of the latch structure resides in its formation solely from the bent wire extremities in such a manner that substantially right angle contact will be maintained between these extremities when in latched position.

It is yet another object of this invention to provide a hook setter which is efficient in operation, economical to manufacture, simple in construction, and which may be marketed at a relatively low price to the user.

Some of the objects of the invention having been stated, other objects will appear as the description proceeds when taken in connection with the accompanying drawings, in which;

Figure 1 is an isometric view of my improved hook setter in cocked position, and installed in a fishing line;

Figure 2 is a side view, with portions shown in section, showing the hook setter after it has been tripped by a fish;

Figure 3 is a side view showing a further position assumed by the tripped hook setter after the fishing line has been straightened under the tension exerted by the pull of the fisherman;

Figure 4 is an elevational view looking at the right-hand side of Figure 3;

Figure 5 is a sectional detail view taken along line 5—5 in Figure 4;

Figure 6 is a sectional detail view taken along line 6—6 in Figure 4;

Figure 7 is a fragmentary side elevation showing a slightly modified form of the hook setter, similar to the preceding form but omitting the sinker therefrom to thereby render flexible the entire length of the wire from which the device is made; and Figure 8 is a fragmentary side elevation showing another modified form of hook setter similar to the form shown in Figures 1 through 6, but omitting the sinker and substituting therefor a rigid segment in the wire.

Referring more specifically to the drawings, the numeral 10 broadly designates one form of my improved hook setter. The device is formed from an elongated piece of wire made of suitable material such as spring steel which is suitably bent to provide a relatively straight intermediate portion 11, a helical spring coil 12 at one end of the intermediate portion, a second helical spring coil at the opposite end of said portion, and further providing relatively long and short end portions 15 and 16 projecting from coils 12 and 14, respectively. Spring coil 12 normally tends to rotate the long end portion 15 in a clockwise direction, whereas coil 14 tends to produce counter clockwise rotation of the short end portion 16.

Intermediate portion 11 is rendered rigid or substantially inflexible by a weight or sinker 17, the latter member being provided with longitudinally extending groove 18 into which the portion 11 is adapted to closely fit. Sinker 17 is also provided with lugs 19 and 20, located respectively at opposite ends of, and adjacent to, groove 18. The sinker 17 is preferably made of a soft metal such as lead so that these lugs may be bent outwardly from the positions shown in the drawings to permit portion 11 to be inserted or removed from the slot 18. After portion 11 is inserted in slot 18, the lugs may be bent over to close the slot and confine the ends of portion 11. If desired, the intermediate portion of the sinker may be compressed to cause the sides of slot 18 to wedge portion 11 in position.

The extremities of long and short end portions 15 and 16 are bent to form a latch for releasably connecting these extremities. One part of the latch comprises a transversely disposed loop or eye 23 formed by bending the extremity of long end portion 15. The cooperating part of the latch is formed by providing a slight bend or hook 24 on the extremity of short end portion 16.

By observing Figure 1 it can be seen that hook 24 is inserted in the eye 23 when the extremities are latched, at which time the stresses exerted by the oppositely-acting spring coils, as well as the resiliency of the end portions, are confined by the latch. These oppositely acting stresses cause the long wire end portion 15 to assume a bowed shape when in latched position as shown in Figure 1. In latched position, substantially right-angle contact is maintained between the extremities to form a stable connection. The sensitivity of the latch may be varied by adjusting the angularity of hook 24.

The above-described hook setter is installed as a link in a fishing line. The line comprises line segment 27 extending from the fisherman's reel to spring coil 12, the long wire end portion 15, and a hook line segment 28 having one end thereof secured as at 23 to end portion 15. The lower end of segment 28 has hook 29 secured thereto, said hook having a barb 30 which serves to hook a fish 31 at the appropriate time. When the fish exerts a slight pull on the hook line 28, the bow in the latched long end portion 15 is reduced or flattened slightly thereby causing the loop 23 to slide longitudinally toward the extremity of hook 24 until the latch becomes disengaged, thus permitting the stressed end portions 15 and 16 to rotate in opposite directions to the positions shown in Figures 2 and 3.

Figure 7 shows a slightly modified form 10a of the invention which is identical to the structure shown in the preceding figures except for the omission of sinker 17. This omission renders the wire resilient throughout its length, and is a valuable feature in some instances where it is desired to reduce the stress exerted by the spring coils 12 and 14 upon the latch as well as to reduce the weight of the device.

Figure 8 shows still another modified form 10b featuring the rigidity provided in the form shown in Figures 1 through 6 and the light weight provided in the form shown in Figure 7. In the form 10b, that portion of the wire disposed between coils 12 and 14 is rendered rigid or substantially inflexible by providing an enlarged portion 11a.

In the forms shown in Figures 8 and 9, suitable sinkers may be located along the line independent of the hook setter, if desired.

As heretofore pointed out in the objects of the invention, the oppositely-acting spring-pressed long and short arms 15 and 16, when released from latched position, operate in such a manner as to stabilize the hook setter against bodily rotation. This stabilization results from the simultaneous rotation of the arms in opposite directions when the latched ends thereof are tripped, and it serves to reinforce the snap action of coil 12 to cause an increased proportion of the energy stored in the latter to be exerted against long arm 15 and the attached hook line segment 28, thus providing more efficient operation.

It will be observed that the invention is shown and described in association with fishing tackle equipped for bait fishing. It is to be understood, however, that a wider range of uses is contemplated. For example, the device may be attached to, or made a part of, any metal lure, or in fact employed in association with other types of fishing equipment where it is desired to automatically impart a sudden jerk to a hook or hooks in response to a nibble or pull by a fish.

In the drawings and specification, preferred embodiments of the invention are disclosed, and although specific terms are employed they are not intended for purposes of limitation, the scope of the invention being set forth in the following claims.

I claim:

1. A fishhook setter for use with a fishing line, comprising a substantially inflexible elongated intermediate portion, said portion having relatively short and long flexible end portions projecting respectively from the opposite ends thereof, the relatively short end portion having a helical spring coil formed therein adjacent one end of the rigid intermediate portion and normally tending to rotate the associated wire extremity in one direction, the relatively long end portion having an oppositely-acting helical spring coil formed therein adjacent the other end of the rigid intermediate portion and normally tending to rotate its associated wire extremity in a direction opposite said first direction, and an eye formed at the extremity of the long end portion and adapted to have one end of a hook line attached thereto, the extremity of said short end portion being releasably engageable with said eye when the extremities of said end portions are rotated in opposite directions against the tensions in their respective springs, whereby a pull on said hook line will disengage said eye from the short end portion to permit the short end extremity to rotate in one direction and the long end extremity and attached hook line to simultaneously rotate in the opposite direction about the respective helical spring coils.

2. A fishhook setter for use with a fishing line, comprising a substantially inflexible elongated intermediate portion, said portion having relatively short and long spring wire end portions projecting respectively from opposite ends thereof; the relatively short spring wire end portion having formed therein at a point adjacent one end of the intermediate portion a helical spring coil adapted to rotate the associated wire end portion in one direction, and the relatively long spring wire end portion having formed therein at a point adjacent the other end of said intermediate portion an oppositely-acting helical coil spring adapted to rotate its associated wire end portion in an opposite direction, said coil in the long wire end portion being also adapted to have a fish line secured thereto; a hook line attaching means comprising a loop formed in the extremity of said long end portion; and means including a short hook formed in the extremity of the short end portion for releasably latching the extremities of said long and short wire end portions one to another, said hook being adapted to releasably engage said loop.

3. A fishing line attachment comprising, an elongated substantially inflexible wire portion having relatively short and long spring wire end portions projecting respectively from opposite ends thereof, oppositely-acting helical spring coils formed respectively in said end portions adjacent the ends of the inflexible wire portion, a loop in the extremity of said long end portion, and means including a short hook formed in the extremity of the short end portion for releasably latching the extremities of said long and short wire end portions one to another against the combined tension exerted by the oppositely-acting spring coils, said hook being adapted to releasably engage said loop and said combined tension producing a bow in said latched long end portion, whereby when a fish line is connected to said long end portion adjacent the helical coil formed therein, and a hook line is connected adjacent the extremity of the long end portion, the tensioning of said interconnected fish line, bowed long end portion, and hook line will release said loop from said short hook.

References Cited in the file of this patent

UNITED STATES PATENTS

| | | |
|---|---|---|
| 1,905,410 | McCall | May 12, 1931 |
| 2,504,822 | Fritscher | Apr. 18, 1950 |
| 2,851,810 | Vahrenwald | Sept. 16, 1958 |